(12) United States Patent
Su et al.

(10) Patent No.: US 12,215,818 B2
(45) Date of Patent: Feb. 4, 2025

(54) METHOD FOR CONTROLLING HANDHELD GIMBAL, AND HANDHELD GIMBAL

(71) Applicant: SZ DJI TECHNOLOGY CO., LTD., Shenzhen (CN)

(72) Inventors: Tie Su, Shenzhen (CN); Wenlin Xie, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 831 days.

(21) Appl. No.: 17/202,738

(22) Filed: Mar. 16, 2021

(65) Prior Publication Data
US 2021/0247783 A1 Aug. 12, 2021

Related U.S. Application Data

(63) Continuation of application No. PCT/CN2018/115766, filed on Nov. 15, 2018.

(51) Int. Cl.
*F16M 11/12* (2006.01)
*F16M 11/18* (2006.01)
*F16M 13/04* (2006.01)

(52) U.S. Cl.
CPC .......... *F16M 11/18* (2013.01); *F16M 11/123* (2013.01); *F16M 13/04* (2013.01); *F16M 2200/041* (2013.01)

(58) Field of Classification Search
CPC ........ F16M 11/02; F16M 11/04; F16M 11/06; F16M 11/08; F16M 11/10; F16M 11/105; F16M 11/12; F16M 11/121; F16M 11/123; F16M 11/125; F16M 11/126; F16M 11/128; F16M 11/18; F16M 11/20;
(Continued)

(56) References Cited

U.S. PATENT DOCUMENTS

2016/0301845 A1    10/2016    Bell et al.

FOREIGN PATENT DOCUMENTS

CN    101424946 A    5/2009
CN    201400308 Y    2/2010
(Continued)

OTHER PUBLICATIONS

The World Intellectual Property Organization (WIPO) International Search Report for PCT/CN2018/115766 Aug. 21, 2019 6 Pages (including translation).
(Continued)

*Primary Examiner* — Clayton E. LaBalle
*Assistant Examiner* — Fang-Chi Chang
(74) *Attorney, Agent, or Firm* — ANOVA LAW GROUP, PLLC

(57) ABSTRACT

The present disclosure provides a handheld gimbal control method and a handheld gimbal. The method includes: acquiring an input signal (S301); and performing a first control operation triggered by a first trigger signal in response to the input signal being a predetermined first trigger signal, where the first control operation is used to control the yaw axis motor disposed on the handheld gimbal to start and continue to work so as to enable the imaging device carried by the handheld gimbal to start and continue a rolling rotation (S302). The control method relieves a user from pressing the control button on the handle at all times, thereby improving the flexibility of user operation and user experience.

20 Claims, 4 Drawing Sheets

(58) Field of Classification Search
CPC ........... F16M 11/2007; F16M 11/2014; F16M 11/2021; F16M 11/2028; F16M 11/2035; F16M 11/2042; F16M 11/205; F16M 11/2057; F16M 11/2064; F16M 11/2071; F16M 11/22; F16M 13/04; F16M 2200/042; F16M 2200/041; G03B 17/561; G03B 17/563

See application file for complete search history.

(56) References Cited

FOREIGN PATENT DOCUMENTS

| | | | |
|---|---|---|---|
| CN | 203806107 U | 9/2014 | |
| CN | 104881033 A | 9/2015 | |
| CN | 105090695 A | 11/2015 | |
| CN | 204879354 U | 12/2015 | |
| CN | 105759853 A | 7/2016 | |
| CN | 205610783 U | 9/2016 | |
| CN | 106133631 A | 11/2016 | |
| CN | 205754480 U | 11/2016 | |
| CN | 106444859 A | 2/2017 | |
| CN | 107094368 A | 8/2017 | |
| CN | 108323191 A | 7/2018 | |
| CN | 108323192 A | 7/2018 | |
| CN | 108375992 A | 8/2018 | |
| CN | 108700249 A | 10/2018 | |
| EP | 3214354 A1 | 9/2017 | |
| EP | 3236311 A1 | 10/2017 | |
| JP | H0469637 A | 3/1992 | |
| JP | 4668474 B2 * | 4/2011 | |
| JP | 2016099856 A | 5/2016 | |
| JP | 2016-06-09 U | 6/2016 | |
| JP | 3204705 U * | 6/2016 | ........... F16M 11/041 |
| JP | 2017537333 A | 12/2017 | |
| WO | 2014136435 A1 | 9/2014 | |
| WO | 2016154996 A1 | 10/2016 | |
| WO | 2017206072 A1 | 12/2017 | |

OTHER PUBLICATIONS

Daren REN et al., "Advanced Road Traffic Management Dictionary", Sep. 1993, Tianjin People's Publishing House, p. 244-245.
Xiaofeng Zhang et al., "Electrical control and programmable control technology and applications", Apr. 2010, National Defense Industry Press, p. 30-32.

* cited by examiner

METHOD FOR CONTROLLING HANDHELD GIMBAL, AND HANDHELD GIMBAL

CROSS-REFERENCE TO RELATED APPLICATION

This application is a continuation application of International Application No. PCT/CN2018/115766, filed on Nov. 15, 2018, the entire content of which is incorporated herein by reference.

TECHNICAL FIELD

The present disclosure relates to the field of smart terminals and, more specifically, to a method for controlling a handheld gimbal, and a handheld gimbal.

BACKGROUND

As smart mobile terminals become more popular, more people have started to use handheld gimbals for photography. A handheld gimbal may include a handle and a gimbal connected to the handle. An imaging device can be disposed on the gimbal. The handheld gimbal can control the execution of the direction movements, such as rotation and tilting, of the imaging device, such that excellent images and videos may be captured in various direction.

In conventional technology, the handheld gimbal can provide a flashlight mode. When the handheld gimbal is in the flashlight mode, the axis of the handle may coincide with the optical axis of the imaging device, and the lens of the imaging device may face forward, similar to the structure of a flashlight. At this time, a user can manually control the imaging device to rotate around the optical axis by using a control button provided on the handle to complete a 360° rollover. This feature is also called the Roll 360 mode.

However, when the user is controlling under the Roll 360 mode, the user needs to press the control button on the handle at all time. When the user stops pressing the control button on the handle, the imaging device may stop rolling and flipping. As such, the user operation is inflexible and inconvenient.

SUMMARY

The present disclosure provides a handheld gimbal control method and a handheld gimbal to improve the flexibility of the user operation and improve the user experience.

A first aspect of the present disclosure provides a handheld gimbal control method. The method includes acquiring an input signal; and performing a first control operation triggered by a first trigger signal in response to the input signal being a predetermined first trigger signal. In particular, the first control operation is used to control a yaw axis motor disposed on the handheld gimbal to start and continue to work as to enable an imaging device carried by the handheld gimbal to start and continue a rolling rotation.

A second aspect of the present disclosure provides a handheld gimbal. The handheld gimbal includes a gimbal including a gimbal base and a plurality of axis joints, each of the axis joints including a motor and an axis arm drivingly connected to the motor; a handle connected to the gimbal base; an imaging device carried by the gimbal; a memory storing program instructions; and a processor. The processor is configured to execute the program instructions to acquire an input signal; and perform a first control operation triggered by a first trigger signal in response to the input signal being a predetermined first trigger signal. In particular, the first control operation is used to control a yaw axis motor disposed on the handheld gimbal to start and continue to work as to enable an imaging device carried by the handheld gimbal to start and continue a rolling rotation.

A third aspect of the present disclosure provides storage medium. The storage medium includes a readable storage medium and a computer program. The computer program is used to implement the handheld gimbal control method provided by any one of the embodiments of the first aspect mentioned above.

A fourth aspect of the present disclosure provides software product. The software product includes a computer program (i.e., executable instructions), and the computer program can be stored in a storage medium. A processor may be configured to read the computer program from the readable storage medium. Further, the processor can execute the computer program to implement the handheld gimbal control method provided by any one of the embodiments of the first aspect mentioned above.

The present disclosure provides a handheld gimbal control method and a handheld gimbal. By acquiring the input signal, a first control operation being triggered by a first trigger signal in response to the input signal being a predetermined first trigger signal can be performed. The first control operation is used to control the yaw axis motor disposed on the handheld gimbal to start and continue to work, such that the imaging device carried by the handheld gimbal may be enabled to start and continue a rolling rotation. Since the user is prevented from pressing the control button on the handle at all times, the flexibility of the user operation and the user experience may be improved.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

In order to make the objectives, technical solutions, and advantages of the present disclosure more clear, the technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

The method for controlling the handheld gimbal provided in the embodiments of the present disclosure can be applied to a device including a multi-axis gimbal. For example, in each embodiment of the present disclosure, a handheld gimbal including a three-axis gimbal may be used as an example for illustrative description. It can be understood that the gimbal may also be a gimbal with other structures such as single-axis, two-axis, or four-axis.

Figure 1:
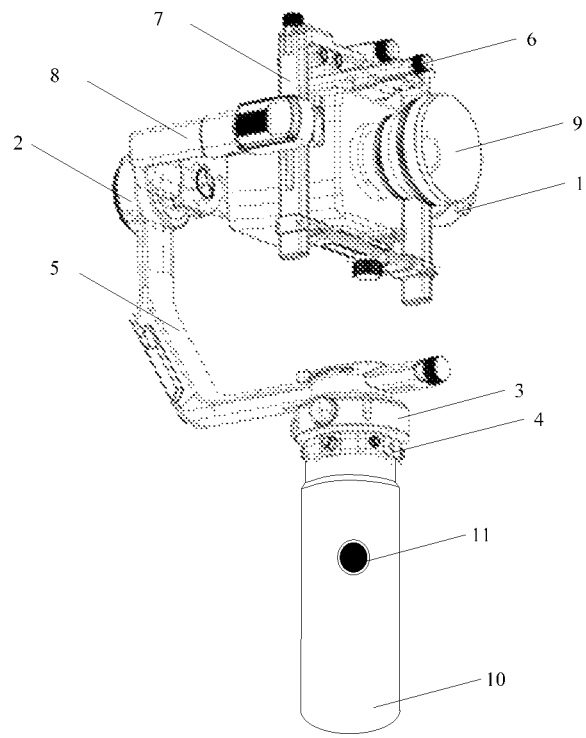
FIG. 1 is a structural diagram of a handheld gimbal according to embodiments of the present disclosure.

For example, FIG. 1 is a structural diagram of a handheld gimbal according to embodiments of the present disclosure. As shown in FIG. 1, the handheld gimbal may include a handle 10, a three-axis gimbal, and an imaging device 9.

A control button 11 can be arranged on the handle 10 to input the control amount of a rocker movement for controlling the motor movement of the three-axis gimbal. It should be noted that the implementations of the control button 11 is not limited in the present embodiments. For example, the control button 11 may be a rocker.

The three-axis gimbal may include a gimbal base 4 and three axis joints. The gimbal base 4 may be connected to the handle 10. Each axis joint may include a motor and an axis arm drivingly connected to the motor. More specifically, the three axis joint may include a yaw axis joint, a pitch axis joint, and a roll axis joint. The yaw axis may also be referred to as the translation axis. The yaw axis joint may be connected to the gimbal base 4. The yaw axis joint includes a yaw axis motor 3 and a yaw axis arm 5 drivingly connected to the yaw axis motor 3. The roll axis joint includes a roll axis motor 2 and a roll axis arm 8 drivingly connected to the roll axis motor 2. The pitch axis joint includes a pitch axis motor 1 and a pitch axis arm 7 drivingly connected to the pitch axis motor 1.

It should be noted that when the attitudes of the handle 10 and the imaging device 9 are different, the yaw axis motor 3, the roll axis motor 2, and the pitch axis motor 1 may rotate with respect to the axes in different directions in a body coordinate system of the handle 10 and the imaging device 9. For example, in the attitude shown in FIG. 1, the handle 10 is vertical and the optical axis of the imaging device 9 is horizontal. At this time, with respect to the body coordinate system of the imaging device 9, the yaw axis motor 3 can rotate around the yaw axis of the imaging device 9, the roll axis motor 2 can rotate around the roll axis of the imaging device 9, and the pitch axis motor 1 can rotate around the pitch axis of the imaging device 9. If the handle 10 is rotated 90° clockwise such that the handle may be horizontal, and the pitch axis motor 1 is rotated 90° counterclockwise such that the optical axis of the imaging device 9 may still be horizontal. At this time, with respect to the body coordinate system of the imaging device 9, the yaw axis motor 3 can rotate around the roll axis of the imaging device 9, the roll axis motor 2 can rotate around the yaw axis of the imaging device 9, and the pitch axis motor 1 can rotate around the pitch axis of the imaging device 9. More specifically, the handle 10 generally includes a front side and a rear side. The front side is generally provided with function operating parts such as a rocker, and the rear side facing away from the front side may also be provided with some function keys, such as shortcut keys. When imaging an object in front, the lens of the imaging device 9 may face toward a direction that the rear side of the handle 10 faces.

If the direction of the forward object that the imaging device 9 is facing, that is, the direction in which the rear side of the handle 10 is facing, is referred to as the front, then as mentioned above, the handle 10 may be rotated 90° clockwise such that the handle may be horizontal, that is, the handle 10 may be fall forward by 90°.

Since the imaging device 9 follows the movement of the handle 10, when the handle 10 falls forward by 90°, if the initial attitude of the imaging device 9 is facing forward and the optical axis is horizontal, the imaging device may be rotated to a position facing downward at this time. In order to enable the imaging device 9 to image a forward object, the pitch axis motor may be controlled to rotate 90°. At this time, the optical axis of the imaging device 9 may be parallel or coincident with the axis of the handle 10, and the flashlight mode may be used at this time.

It can be understood that before rotating the handle 10, the pitch axis motor can be controlled to rotate the imaging device 9, such that the optical axis of the imaging device 9 may be parallel or coincident with the axis of the handle 10. Subsequently, the handle 10 may be rotated to fall forward, and the imaging device 9 may follow the movement and adjust to the flashlight mode in the end.

In some embodiments, the handheld gimbal may include an imaging device fixing mechanism 6 for fixing the imaging device 9. The shape and position of the imaging device fixing mechanism 6 are not limited in the embodiments of the present disclosure. In some embodiments, an inertial measurement element may be arranged on the imaging device fixing mechanism 6. In some embodiments, the inertial measurement element may be a gyroscope, an accelerometer, etc.

It can be understood that if the gimbal is a single-axis gimbal, it may be rotatably connected to the handle through the yaw axis motor.

Figure 2:
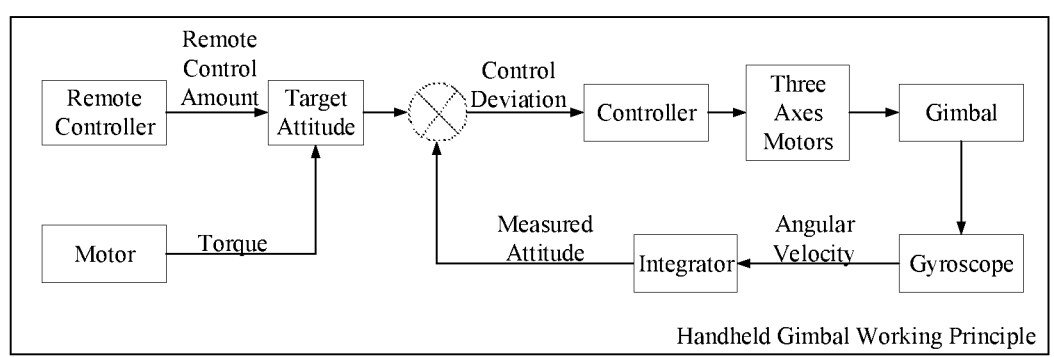
FIG. 2 is a diagram illustrating the working principle of the handheld gimbal according to embodiments of the present disclosure.

FIG. 2 is a diagram illustrating the working principle of the handheld gimbal according to embodiments of the present disclosure. As shown in FIG. 2, the handheld gimbal can form a closed-loop control system by using the inertial measurement element as the feedback element and the motor as the output element. In this control system, the control amount may be the attitude of the handheld gimbal, including the attitude of the handle and/or the imaging device. For a given target attitude, the measured attitude may achieve the target attitude by using the feedback control. More specifically, the target attitude can be reached by the amount of rocker output by the controller and the torque output by the motor. The controller of the handheld gimbal can control the movement of the motors of the three axes to realize the change of the attitude of the three-axis gimbal. The measured attitude can be reached by the measurement of the gyroscope. Further, based on the target attitude and the measured attitude, the controller can further control the movement of the motors of the three axes, such that the measured attitude may reach the target attitude, and the closed-loop control may be achieved. In particular, a remote controller may include a rocker provided on the handle, or another controller connected to the handheld gimbal.

It should be noted that the embodiments of the present disclosure do not limit the designs of connection between the imaging device 9 and the three-axis gimbal. In some embodiments, the imaging device 9 may be fixedly disposed on the three-axis gimbal. In some embodiments, the imaging device 9 may be detachably disposed on the three-axis gimbal.

It should be noted that the embodiments of the present disclosure do not limit the type of the imaging device 9. For example, the imaging device 9 may be a camera, a video camera, a smartphone, etc. In some embodiments, the imaging device 9 may include an inertial measurement unit.

It should be noted that the embodiments of the present disclosure do not limit the shape of the handle 10 and the control button 11 provided on the handle 10, and the position of the control button 11 on the handle 10 is not limited.

Figure 3:
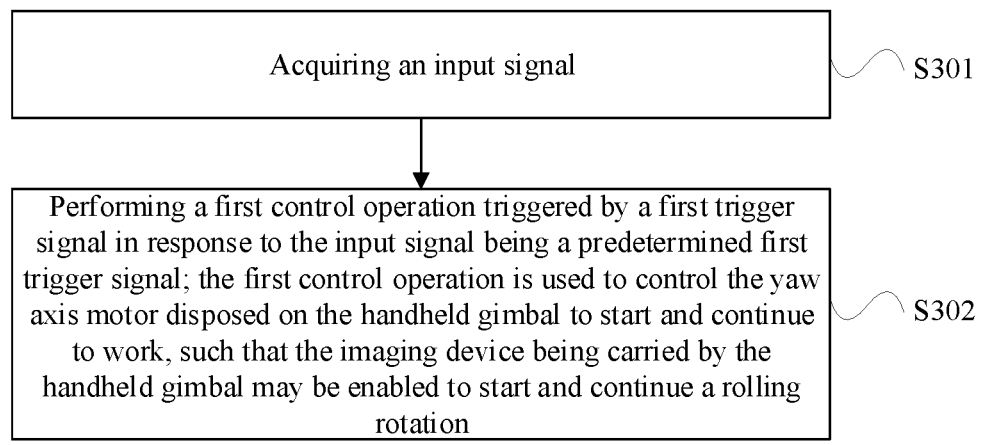
FIG. 3 is a flowchart of a method for controlling the handheld gimbal according to a first embodiment of the present disclosure.

FIG. 3 is a flowchart of a method for controlling the handheld gimbal according to a first embodiment of the present disclosure. In the handheld gimbal control method provided in the present embodiment, the execution body may be a handheld gimbal. As shown in FIG. 3, the method for controlling the handheld gimbal provided in the present embodiment may include:

S301, acquiring an input signal.

S302, performing a first control operation triggered by a first trigger signal in response to the input signal being a predetermined first trigger signal. The first control operation may be used to control the yaw axis motor disposed on the handheld gimbal to start and continue to work, such that the imaging device carried by the handheld gimbal may be enabled to start and continue a rolling rotation.

More specifically, after acquiring the input signal, the input signal may be detected to determine whether the input signal is a predetermined trigger signal. The present embodiment does not limit the number and implementations of the predetermined trigger signals. Different trigger signals can trigger different control operations. In the present embodiment, if the input signal is the predetermined first trigger signal, the first trigger signal may trigger the first control operation. The first control operation may be used to control the yaw axis motor disposed on the handheld gimbal to start and continue to work, such that the imaging device carried by the handheld gimbal may be enabled to start and continue a rolling rotation, that is, the rotation driven by the yaw axis motor in the flashlight mode.

In conventional technology, when the user keeps pressing the control button on the handle, the handheld gimbal can continuously detect a signal, thereby controlling the imaging device to keep rolling and flipping. When the user stops pressing the control button, the handheld gimbal cannot detect the signal, thus controls the imaging device to stop rolling and flipping. In the present embodiment, the first trigger signal can be detected in the input signal, indicating that the first trigger signal may be a signal that occupies a limited time in the time domain. Therefore, the user does not need to press the control button on the handle at all times. After the user perform a triggering operation to generate a trigger signal, the handheld gimbal may be triggered to perform a control operation.

It can be seen that, by detecting the input signal, the method for controlling the handheld gimbal provided in the present embodiment may trigger the imaging device to start and continue a rolling rotation when it is determined that the input signal includes the first trigger signal, thereby preventing the user from pressing the control button on the handle at all times, which may improve the flexibility of the user operation and user experience.

The first trigger signal may be received and a motion mode of the imaging device may be controlled based on a pre-configured corresponding instruction. The first trigger signal may trigger one of two motion modes, which may be a continuous clockwise rotation and a continuous counter-clockwise rotation, respectively.

In the present embodiment, if the user shakes the rocker to the left, when viewed from the direction of the handle, the imaging device may be rotated counterclockwise under the drive of the yaw axis motor. Further, if the user shakes the rocker to the right, when viewed from the direction of the handle, the imaging device may be rotated clockwise under the drive of the yaw axis motor.

It should be noted that in the present embodiment, the attitudes of the imaging device and the handle are not limited before the imaging device is triggered to start and continue the rolling rotation.

Figure 4:
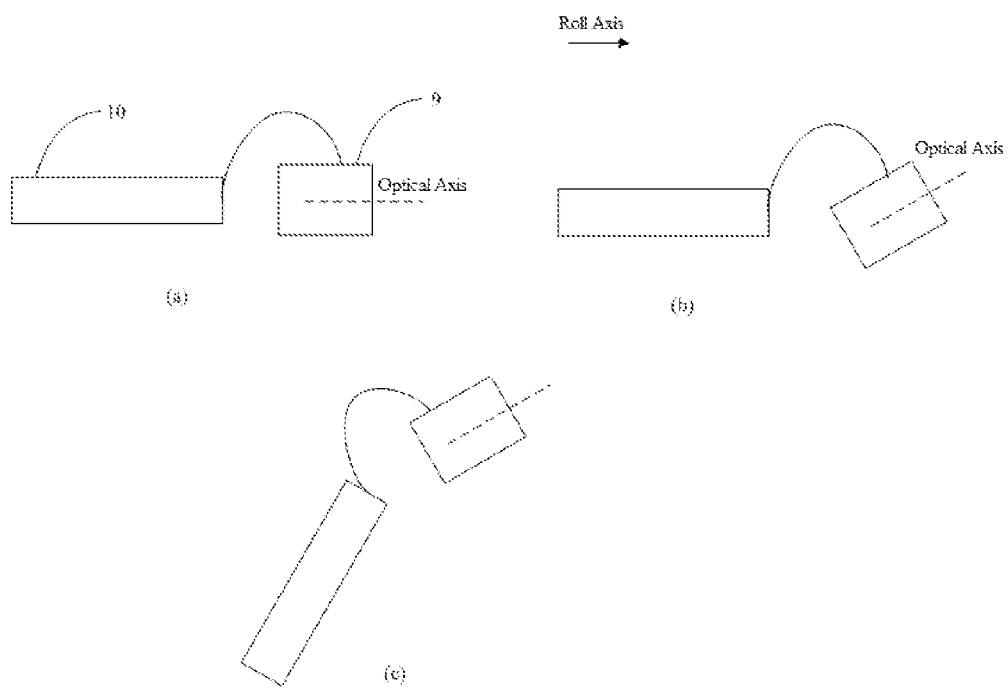
FIG. 4 is an attitude view of the handheld gimbal according to the first embodiment of the present disclosure.

For example, FIG. 4 is an attitude view of the handheld gimbal according to the first embodiment of the present disclosure. In FIG. 4, the imaging device 9 is facing forward, and the horizontal direction is the roll axis direction of the body coordinate system of the imaging device.

As shown in FIG. 4(a), the optical axis of the imaging device 9 is parallel to the axis of the handle 10, and the imaging device 9 is in the flashlight mode. At this time, if the yaw axis motor disposed on the handheld gimbal is controlled to work continuously, it is possible to realize the continuous rolling rotation of the imaging device around the yaw axis motor. If the optical axis of the imaging device coincides with the axial direction of the yaw axis motor, the imaging device may continue the rolling rotation around its optical axis. As shown in FIG. 4(b), the optical axis of the imaging device forms an angle with the axis of the handle. The axis of the handle 10 is horizontal. As shown in FIG. 4(c), the optical axis of the imaging device forms an angle with the axis of the handle. The axis of the handle 10 is inclined. For the attitudes shown in FIG. 4(b) and FIG. 4(c), when the yaw axis motor disposed on the handheld gimbal is controlled to work continuously, the continuous rolling rotation of the imaging device may also be realized.

In some embodiments, in S302, performing the first control operation triggered by the first trigger signal may include determining the first control operation triggered by the first trigger signal based on a predetermined correspondence between the trigger signal and the control operation; and performing the first control operation.

It should be noted that the present embodiment does not specifically limit the multiple predetermined trigger signals and the control operations triggered by different trigger signals.

In some embodiments, the predetermined trigger signal can be an edge signal. The edge signal may include a rising edge signal and a falling edge signal. In the present embodiment, the number and sequence of the rising edge signal and/or the falling edge signals included in the trigger signal are not limited. For example, the trigger signal can include two consecutive rising edge signals, two consecutive falling edge signals, one rising edge signal and one falling edge signal, one falling edge signal and one rising edge signal, two rising edge signals and one falling edge signal, etc.

In particular, the rising edge signal can be the moment when the low level becomes the high level, and the falling edge signal can be the moment when the high level becomes the low level. In some embodiments, the edge rate of the edge signal can be the response time of the signal edge change generally measured by the rising time and falling time of the signal.

Figure 5:
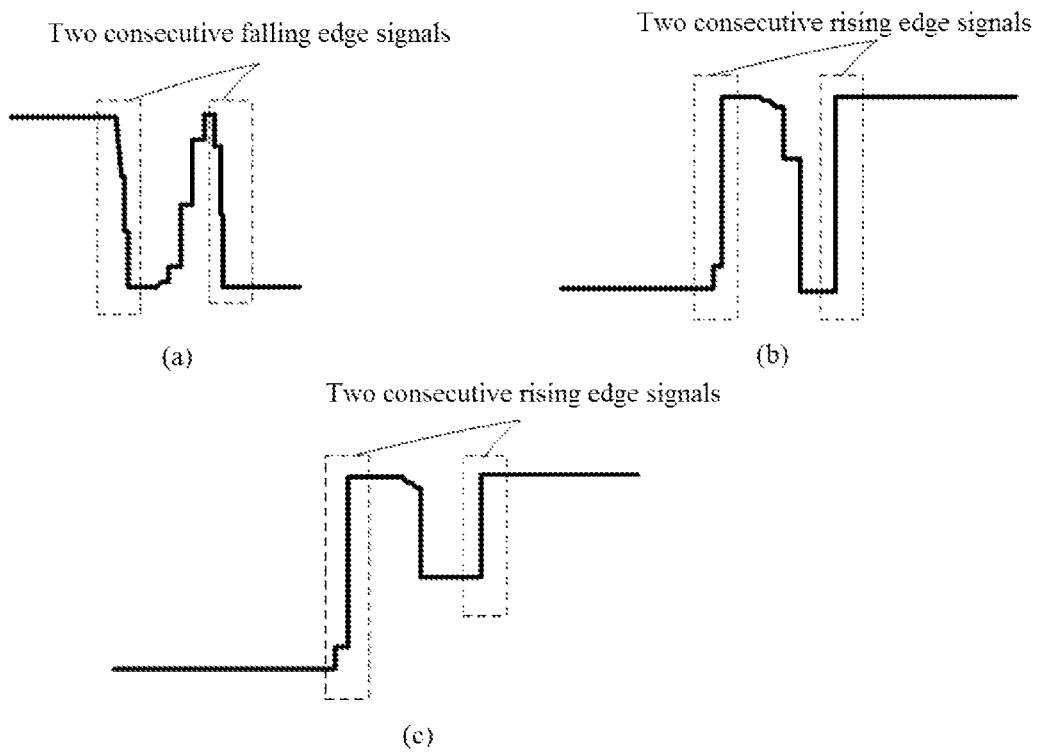
FIG. 5 is a diagram illustrating a trigger signal according to the first embodiment of the present disclosure.

The trigger signal is described below through a specific example. FIG. 5 is a diagram illustrating a trigger signal according to the first embodiment of the present disclosure.

As shown in FIG. 5(a), the trigger signal can include two consecutive falling edge signals. As shown in FIG. 5(b), the trigger signal can include two consecutive rising edge signals. As shown in FIG. 5(c), the trigger signal can include two consecutive rising edge signals. In particular, the difference between FIG. 5(b) and FIG. 5(c) is that the amplitude of the second rising edge signal is different.

In some embodiments, the control operation may include at least one of the following implementations.

In some embodiments, the yaw axis motor may be controlled to start and continue to work, such that the imaging device may start and continue the rolling rotation in a clockwise direction.

In some embodiments, the yaw axis motor may be controlled to start and continue to work, such that the imaging device may start and continue the rolling rotation in a counterclockwise direction.

In some embodiments, the yaw axis motor may be controlled to start and continue to work, such that the imaging device may start and continue the rolling rotation in a clockwise direction until the rotation angle reaches a first predetermined angle, then the yaw axis motor may be controlled to stop working.

In some embodiments, the yaw axis motor may be controlled to start and continue to work, such that the imaging device may start and continue the rolling rotation in a counterclockwise direction until the rotation angle reaches a second predetermined angle, then the yaw axis motor may be controlled to stop working.

In some embodiments, the yaw axis motor may be controlled to start and continue to work, such that the imaging device may start and continue the rolling rotation in a clockwise direction. After the rotation angle reaches a third predetermined angle, the yaw axis motor may be controlled to continue to work until the roll angle of the imaging device is approximately 0°, then the yaw axis motor may be controlled to stop working.

In some embodiments, the yaw axis motor may be controlled to start and continue to work, such that the imaging device may start and continue the rolling rotation in a counterclockwise direction. After the rotation angle reaches a fourth predetermined angle, the yaw axis motor may be controlled to continue to work until the roll angle of the imaging device is approximately 0°, then the yaw axis motor may be controlled to stop working.

More specifically, the first and second implementations described above may be used to realize the continuous rolling rotation of the imaging device. The third and fourth implementations described above may be used to realize the continuous rolling rotation and the automatic rotation stop of the imaging device until the rotation reaches the predetermined angle. The fifth and sixth implementations described above may be used to realize the continuous rolling rotation and the automatic rotation stop of the imaging device until the rotation reaches the predetermined angle, and the stopping attitude of the imaging device may be automatically maintained horizontal. At this time, the roll angle of the imaging device may be approximately 0°, which allows a very small error. That is, the roll angle of the imaging device may be smaller than a predetermined value. The present embodiment does not limit the specific value of the predetermined value.

In some embodiments, at least one of the first predetermined angle, the second predetermined angle, the third predetermined angle, and the fourth predetermined angle may be 360°.

In some embodiments, in S301, acquiring the input signal may include acquiring the operation direction and control amount of the rocker in response to detecting the user triggering the rocker disposed on the handheld gimbal; and generating the input signal based on the operation direction and control amount of the rocker.

More specifically, the user can operate the rocker disposed on the handheld gimbal, thereby inputting the operation direction and control amount of the rocker. Further, the handheld gimbal can acquire the input signal generated based on the operation direction and control amount of the rocker.

It should be noted that the triggering operation performed by the user is not limited in the present embodiment.

In some embodiments, the input signal may be an edge signal, and generating the input signal based on the operation direction and control amount of the rocker may include determining whether the input signal is a rising edge signal or a falling edge signal based on the operation direction; and determining a starting point and an ending point of the amplitude change of the input signal at the rising edge or the falling edge based on the control amount of the rocker.

In particular, the correspondence between the operation direction and the signal edge is not limited in the present embodiment. In some embodiments, moving the rocker to the left may generate a rising edge signal, and moving the rocker to the right may generate a falling edge signal. In some embodiments, moving the rocker up may generate a rising edge signal, and moving the rocker down may generate a falling edge signal.

In some embodiments, the starting point and ending point of the amplitude change of the input signal at the rising edge or the falling edge may be determined based on the control amount of the rocker. As long as a movement of the rocker is detected, the amplitude change at the rising edge or the falling edge can be a predetermined amplitude.

For example, as shown in FIG. 5(b), the user may move the rocker from an initial position to the right to the maximum position, and the user may move the rocker from the middle position to the right of the rocker to the right to the maximum position. The starting point and ending point of the corresponding rising signal may be the same, and both of which may be the predetermined amplitudes.

In some embodiments, acquiring the control amount of the rocker may include acquiring a starting value and an ending value of the control amount based on the initial position and the ending position of the rocker in the operation direction.

Determining the starting point and ending point of the amplitude change of the input signal at the rising edge or the falling edge based on the control amount of the rocker may include determining the starting point and ending point of the amplitude change of the input signal at the rising edge or the falling edge, respectively, based on starting value and ending value of the control amount.

For example, as shown in FIG. 5(c), when the user moves the rocker for the first time, the user moves the rocker from the initial position of the rocker to the right to the maximum position. At this time, the starting value of the control amount may be 0, and the ending value may be the predetermined maximum value of the control amount. Correspondingly, the starting point and ending point of the amplitude change of the first rising edge signal may correspond to the predetermined amplitude value. Subsequently, the user pulls the rocker back from the maximum position to the right to the middle position to the right, and move the rocker a second time from the middle position to the right. At this time, the starting value of the control amount may be half of the predetermined maximum value, and the ending value may be the predetermined maximum value of the control amount. Correspondingly, the starting point and ending point of the amplitude change of the first rising edge signal may correspond to half of the predetermined amplitude value. More specifically, if the user moves the rocker, the amplitude of the second move may be greater than or equal to half of the amplitude of the first move. Therefore, the user may perform the second move without waiting for the rocker to be completely reset after the first move, thereby ensuring a good user experience.

In some embodiments, the triggering operation performed by the user on the rocker disposed on the handheld gimbal may include the user moving the rocker to the right or left for N consecutive times, where N is a positive integer.

It should be noted that the specific value of N is not limited in the present embodiment. In some embodiments, N may be equal to two.

In some embodiments, moving the rocker to the right or left twice in succession may trigger the generation of two electrical signals.

For details, reference may be made to the description of FIG. 5 described above. The principle is similar, and details will not be described herein again.

In some embodiments, in the two electrical signals, if the amplitude of the second electrical signal is greater than or equal to half of the amplitude of the first electrical signal, the triggering of the second electrical signal may be determined to be successful. Of course, the amplitude of the second electrical signal may also be greater than or equal to 1/3, 4/3, 2/3, or other values of the amplitude of the first electrical signal.

More specifically, when the user performs two consecutive move operations, the first move generally has a relatively large amplitude. For example, a full move of the rocker. Subsequently, the rocker needs to be pulled back to continue the second move. When the user moves the rocker for the second time, the starting position of the rocker generally does not need to return to the initial position of the rocker. Correspondingly, the amplitude of the move will also decrease. Therefore, when it is determined that the amplitude of the second electrical signal is greater than or equal to half of the amplitude of the first electrical signal, it can be determined that the triggering of the second electrical signal is successful. As such, the accuracy of the trigger signal determination may be improved, and the accuracy of the handheld gimbal control operation may be improved.

In some embodiments, in the two electrical signals, if the response time of the signal edge change of each electrical signal is shorter than a first predetermined duration, the triggering of the electrical signal may be determined to be successful.

More specifically, the trigger signal is generally a short time domain signal. The electrical signal can be determined as the trigger signal only when the time of the signal edge change of each electrical signal is short enough.

By determining the timing of the signal edge change, the accuracy of the trigger signal determination may be improved, which may further improve the accuracy of the handheld gimbal control operation.

It should be noted that the present embodiment does not limit the specific value of the first predetermined duration. For example, the first predetermined duration may be 100 ticks, where tick may indicate the duration of the processing unit.

In some embodiments, if the time interval between the two electrical signals is less than a second predetermined duration, the triggering of the electrical signal may be determined to be successful.

Since the two electrical signals are implemented by consecutive triggering, an electrical signal can be determined to be the trigger signal only when the time interval between the two electrical signals is short enough.

By determining the time interval between the two electrical signals, the accuracy of the trigger signal determination may be improved, which may further improve the accuracy of the handheld gimbal control operation.

It should be noted that the present embodiment does not limit the specific value of the second predetermined duration. For example, the second predetermined duration may be 500 ms.

In some embodiments, in S301, acquiring the input signal may include receiving the input signal transmitted by a controller of the handheld gimbal, the input signal may be generated after the user perform a trigger operation on the controller.

More specifically, the handheld gimbal may be connected to the controller to transmit data and signals. The present embodiment does not limit the specific implementation manner of the controller. For example, the controller can be a smart terminal, a tablet computer, a desktop computer, a remote controller, etc. In some embodiments, an application may be pre-installed on the controller. The input signal acquired by the handheld gimbal may be the signal transmitted by the controller.

In some embodiments, the controller may include a touch display screen. A control area may be displayed on the touch display screen, and the input signal may be generated after the user performs a touch operation in the control area.

It should be noted that the present embodiment does not limit the position and shape of the control area. For example, the control area may be a virtual rocker displayed on a touch display.

In some embodiments, the method for controlling the handheld gimbal provided in the present embodiment, in S302, before performing the first control operation triggered by the first trigger signal, the method may further include determining whether the roll angle of the handle of the handheld gimbal is approximately 0°; and performing the first control operation in response to the roll angle of the handle being approximately 0°.

More specifically, whether the handle is horizontal may be determined by determining whether the roll angle of the handle of the handheld gimbal is approximately 0°. When the roll angle of the handle is approximately 0°, that is, when the handle is determined to be horizontal, the first control operation may be performed. For specifics, reference may be made to FIG. 4(a) and FIG. 4 (b).

By determining that the handle is horizontal, the imaging device may be controlled to start and continue the rolling rotation, which may improve the imaging and recording effect when the imaging device is rolling and rotating, thereby improving the user experience.

In some embodiments, determining whether the roll angle of the handle is approximately 0° may include acquiring attitude information of the imaging device; acquiring attitude information of the handle based on the attitude information of the imaging device; and determining whether the roll angle of the handle is approximately 0° based on the attitude information of the handle.

More specifically, an inertial measurement unit may be disposed in the imaging device, and the attitude information of the imaging device may be acquired through the inertial measurement unit. As such, the attitude information of the handle may be acquired. Further, whether the roll angle of the handle is approximately 0° can be determined based on the attitude information of the handle.

In some embodiments, the method for controlling the handheld gimbal provided in the present embodiment, in S302, before performing the first control operation triggered by the first trigger signal, the method may further include determining whether the roll angle of the imaging device is approximately 0°; and performing the first control operation in response to the roll angle of the imaging device being approximately 0°.

More specifically, whether the imaging device is horizontal may be determined by determining whether the roll angle of the imaging device is approximately 0°. When the roll angle of the imaging device is approximately 0°, that is, when the imaging device is determined to be horizontal, the first control operation may be performed. For specifics, reference may be made to FIG. 4(a), FIG. 4 (b), and FIG. 4(c).

By determining that the imaging device is horizontal, the imaging device may be controlled to start and continue the rolling rotation, which may improve the imaging and recording effect when the imaging device is rolling and rotating, thereby improving the user experience.

In some embodiments, determining whether the roll angle of the imaging device is approximately 0° may include acquiring the attitude information of the imaging device; and determining whether the roll angle of the imaging device is approximately 0° based on the attitude information of the imaging device.

More specifically, an inertial measurement unit may be disposed in the imaging device, and the attitude information of the imaging device may be acquired through the inertial measurement unit. Further, whether the roll angle of the imaging device is approximately 0° can be determined based on the attitude information of the imaging device.

In some embodiments the method for controlling the handheld gimbal provided in the present embodiment, in S302, before performing the first control operation triggered by the first trigger signal, the method may further include determining whether the pitch angle and/or the yaw angle of the imaging device are approximately 0°; and performing the first control operation in response to the pitch angle and/or the yaw angle of the imaging device being approximately 0°.

More specifically, whether the imaging device is tilted upward or downward may be determined by determining whether the pitch angle of the imaging device is approximately 0°. For example, as the attitudes shown in FIG. 4(b) and FIG. 4(c), the imaging device may be tilted upward. Whether the imaging device is deflected to the left or right may be determined by determining whether the yaw angle of the imaging device is approximately 0°. When the roll angle, pitch angle, and yaw angle of the imaging device are all approximately 0°, the handheld gimbal can be determined to be in the flashlight mode. At this time, the yaw axis motor disposed on the handheld gimbal may be controlled to work continuously, which may realize the continuous rolling rotation of the imaging device around its optical axis.

By determining the pitch angle and the yaw angle of the imaging device, when the pitch angle and/or the yaw angle are approximately 0°, the imaging device may be controlled to start and continue the rolling rotation, which may improve the imaging and recording effect when the imaging device is rolling and rotating, thereby improving the user experience.

It should be noted that in each embodiment of the present disclosure, approximately 0° means that a very small error is allowed. The error may be smaller than a predetermined value. The present embodiments do not limit the specific value of the predetermined value.

The embodiments of the present discolored provide a method for controlling a handheld gimbal including acquiring an input signal, and performing a first control operation triggered by a first trigger signal in response to the input signal being a predetermined first trigger signal. The first control operation may be used to control the yaw axis motor disposed on the handheld gimbal to start and continue to work, such that the imaging device carried by the handheld gimbal may be enabled to start and continue a rolling rotation. In the handheld gimbal provided in the embodiments, when the input signal is determined to be the first trigger signal, the imaging device may be triggered to start and continue the rolling rotation, which may relieve the user from pressing the control button on the handle at all times, thereby improving the flexibility of the user operation and the user experience.

Figure 6:
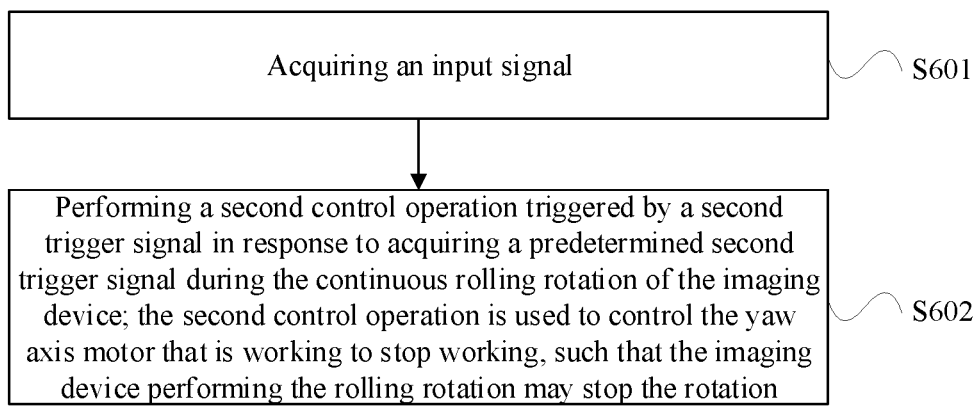
FIG. 6 is a flowchart of a method for controlling the handheld gimbal according to a second embodiment of the present disclosure.

FIG. 6 is a flowchart of a method for controlling the handheld gimbal according to a second embodiment of the present disclosure. In the handheld gimbal control method provided in the present embodiment, the execution body may be a handheld gimbal, which may be applied to a scene in which an imaging device has been triggered to perform a rolling rotation. As shown in FIG. 6, the method for controlling the handheld gimbal provided in the present embodiment may include:

S601, acquiring an input signal; and

S602, performing a second control operation triggered by a second trigger signal in response to acquiring a predetermined second trigger signal during the continuous rolling rotation of the imaging device. The second control operation may be used to control the yaw axis motor that is working to stop working, such that the imaging device performing the rolling rotation may stop the rotation.

More specifically, after acquiring the input signal, the input signal may be detected to determine whether the input signal is a predetermined trigger signal. If the input signal is the predetermined second trigger signal, the second trigger signal may trigger a second control operation. The second control operation may be used to control the yaw axis motor that is working to stop working, such that the imaging device performing the rolling rotation may stop the rotation.

When it is determined that the input signal is the second trigger signal, the rolling rotation of the imaging device may be triggered to automatically stop. As such, the user may be prevented from continuously pressing the control button on the handle then releasing the control button to control the imaging device to stop rotating, thereby improving the flexibility of the user control and the user experience.

More specifically, the second trigger signal may be received and used to control a motion mode of the imaging device based on a pre-configured corresponding instruction. The second trigger signal may trigger one of two motion modes, which may be a continuous clockwise rotation which may stop when the roll angle is 0°, and a continuous counterclockwise rotation which may stop when the roll angle is 0°, respectively.

In the present embodiment, a stop trigger button of the handheld gimbal may be disposed on the back of the handle, and the second trigger signal may be generated by double-clicking the stop trigger button. On one hand, if the imaging device is currently rotating clockwise, the motion mode triggered by the second trigger signal may be the continuous clockwise rotation which may stop until the roll angle is 0°. On the other hand, if the imaging device is currently rotating counterclockwise, the motion mode triggered by the second trigger signal may be the continuous counterclockwise rotation which may stop until the roll angle is 0°. That is, the imaging device may continue to move to a horizontal position and stop based on the current mode.

The double-click operation may also generate two electrical signals. If the amplitude of the second electrical signal is greater than or equal to half of the amplitude of the first electrical signal, the triggering of the second electrical signal may be determined to be successful. That is, the amplitude of the second press may be greater than or equal to half of the amplitude of the first press. The user experience may be that the user does not need to fully release the control button to completely reset the control button after the first press, and only a certain degree of release may be needed. For example, the second press can be performed by releasing the control button halfway. In some embodiments, the amplitude of the second electrical signal may be greater than or equal to 1/3, 4/3, 2/3, or other values of the amplitude of the first electrical signal.

It should be noted that for other technical features such as the trigger signals, the trigger operations, and the edge signals involved in the present embodiment, reference may be made to the embodiments shown in FIG. 3 to FIG. 5. The technical principles and technical effects are similar, and will not be repeated herein again.

In some embodiments, the second control operation may be any one of the following:

In some embodiments, the yaw axis motor that is working may be controlled to stop working immediately such that the imaging device that is performing the rolling rotation may stop the rotation immediately.

In some embodiments, the yaw axis motor that is working may continue to work until the roll angle of the imaging device is 0°, and the yaw axis motor may be controlled to stop working such that the imaging device performing the rolling rotation may be controlled to stop the rotation.

More specifically, for the first implementation described above, the imaging device may be stopped immediately. For the second implementation described above, the stopping attitude of the imaging device may be maintained as horizontal automatically. At this time, the roll angle of the imaging device may be approximately 0°, which allows for a very small error. That is, the roll angle of the imaging device may be smaller than a predetermined value. The present embodiment does not limit the specific value of the predetermined value.

It should be noted that the method for controlling a handheld gimbal provided in the first embodiment shown in FIG. 3 to FIG. 5 and the method for controlling a handheld gimbal provided in the present embodiment may be combined with each other.

The embodiments of the present disclosure provide a method for controlling a handheld gimbal including acquiring an input signal, and performing a second control operation triggered by a second trigger signal in response to determining the input signal to be a predetermined second trigger signal. The second control operation may be used to control the yaw axis motor that is working to stop working, such that the imaging device currently performing the rolling rotation may stop the rotation. In the handheld gimbal control method provided in the embodiments, when the input signal is determined to be the second trigger signal, the imaging device performing the rolling rotation may be triggered to stop the rolling rotation, thereby improving the flexibility of the user operation and the user experience.

Figure 7:
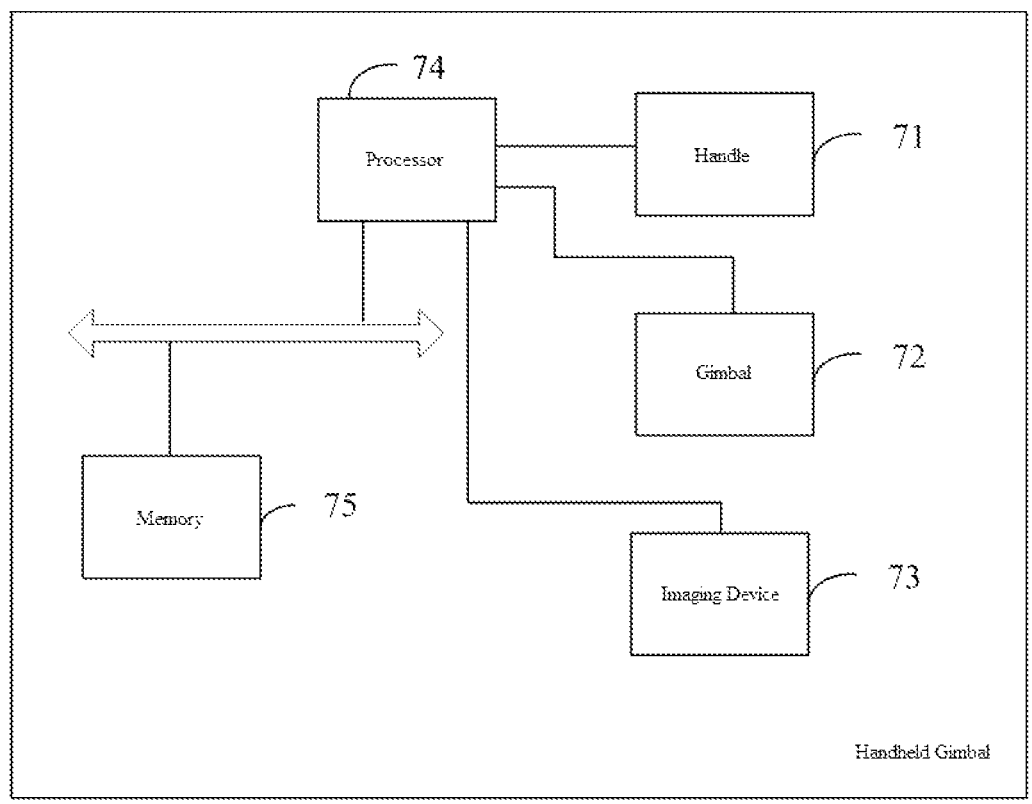
FIG. 7 is a structural schematic diagram of the handheld gimbal according to embodiments of the present disclosure.

FIG. 7 is a structural schematic diagram of the handheld gimbal according to embodiments of the present disclosure.

As shown in FIG. 7, the handheld gimbal provided in the present embodiment may be used to execute the control methods of the handheld gimbal provided in the embodiments shown in FIG. 3 to FIG. 6. As shown in FIG. 7, the handheld gimbal provided in the present embodiment includes a handle 71, a gimbal 72, and an imaging device 73.

The gimbal 72 may include a gimbal base and a plurality of axis joints, and each axis joint may include a motor and an axis arm drivingly connected to the motor. The handle 71 may be connected to the gimbal base, and the imaging device 73 may be disposed on the gimbal.

The gimbal may further include a processor 74 and a memory 75. The memory 75 may be used to store instructions. The processor 74 may be configured to execute the instructions to acquire an input signal; and perform a first control operation triggered by a first trigger signal in response to the input signal being a predetermined first trigger signal. The first control operation may be used to control the yaw axis motor disposed on the handheld gimbal to start and continue to work, such that the imaging device carried by the handheld gimbal may be enabled to start and continue the rolling rotation.

In some embodiments, the processor 74 may be further configured to determine whether the roll angle of the handle of the handheld gimbal is approximately 0°; and perform the first control operation in response to the roll angle of the handle being approximately 0°.

In some embodiments, the processor 74 may be further configured to acquire attitude information of the imaging device; acquire attitude information of the handle based on the attitude information of the imaging device; and determine whether the roll angle of the handle is approximately 0° based on the attitude information of the handle.

In some embodiments, the processor 74 may be further configured to determine whether the roll angle of the imaging device is approximately 0°; and perform the first control operation in response to the roll angle of the imaging device being approximately 0°.

In some embodiments, the processor 74 may be further configured to acquire the attitude information of the imaging device; and determine whether the roll angle of the imaging device is approximately 0° based on the attitude information of the imaging device.

In some embodiments, the processor 74 may be further configured to determine whether the pitch angle and/or the yaw angle of the imaging device are approximately 0°; and perform the first control operation in response to the pitch angle and/or the yaw angle of the imaging device being approximately 0°.

In some embodiments, the processor 74 may be further configured to acquire the operation direction and control amount of the rocker in response to detecting the user performing a trigger operation on the rocker disposed on the handheld gimbal; and generate the input signal based on the operation direction and control amount of the rocker.

In some embodiments, the processor 74 may be further configured to determine whether the input signal is a rising edge signal or a falling edge signal based on the operation direction; and determine a starting point and an ending point of the amplitude change of the input signal at the rising edge or the falling edge based on the control amount of the rocker.

In some embodiments, the processor 74 may be further configured to acquire a starting value and an ending value of the control amount based on the initial position and the ending position of the rocker in the operation direction.

Determining the starting point and ending point of the amplitude change of the input signal at the rising edge or the falling edge based on the control amount of the rocker may include determining the starting point and ending point of the amplitude change of the input signal at the rising edge or the falling edge, respectively, based on the starting value and the ending value of the control amount.

In some embodiments, the trigger operation may include the user moving the rocker to the right or left twice in a row.

In some embodiments, moving the rocker to the right or left twice in a row may trigger two electrical signals.

In some embodiments, in the two electrical signals, if the amplitude of the second electrical signal is greater than or equal to half of the amplitude of the first electrical signal, the triggering of the second electrical signal may be determined to be successful.

In some embodiments, the processor 74 may be further configured to receive the input signal transmitted by a controller of the handheld gimbal, wherein the input signal may be generated after the user performs a trigger operation on the controller.

In some embodiments, the controller may include a touch display screen. A control area may be displayed on the touch display screen, and the input signal may be generated after the user performs a touch operation in the control area.

In some embodiments, the processor 74 may be further configured to determine the first control operation triggered by the first trigger signal based on a predetermined correspondence between the trigger signal and the control operation; and perform the first control operation.

In some embodiments, the control operation may include at least one of the following implementations:

The yaw axis motor may be controlled to start and continue to work, such that the imaging device may start and continue the rolling rotation in a clockwise direction.

The yaw axis motor may be controlled to start and continue to work, such that the imaging device may start and continue the rolling rotation in a counterclockwise direction.

The yaw axis motor may be controlled to start and continue to work, such that the imaging device may start and continue the rolling rotation in a clockwise direction until the rotation angle reaches a first predetermined angle, then the yaw axis motor may be controlled to stop working.

The yaw axis motor may be controlled to start and continue to work, such that the imaging device may start and continue the rolling rotation in a counterclockwise direction until the rotation angle reaches a second predetermined angle, then the yaw axis motor may be controlled to stop working.

The yaw axis motor may be controlled to start and continue to work, such that the imaging device may start and continue the rolling rotation in a clockwise direction. After the rotation angle reaches a third predetermined angle, the yaw axis motor may be controlled to continue to work until the roll angle of the imaging device is approximately 0°, then the yaw axis motor may be controlled to stop working.

The yaw axis motor may be controlled to start and continue to work, such that the imaging device may start and continue the rolling rotation in a counterclockwise direction. After the rotation angle reaches a fourth predetermined angle, the yaw axis motor may be controlled to continue to work until the roll angle of the imaging device is approximately 0°, then the yaw axis motor may be controlled to stop working.

In some embodiments, at least one of the first predetermined angle, the second predetermined angle, the third predetermined angle, and the fourth predetermined angle may be 360°.

In some embodiments, the trigger signal may be an edge signal.

In some embodiments, the processor 74 may be further configured to perform a second control operation triggered by a second trigger signal in response to determining the input signal to be a predetermined second trigger signal. The second control operation may be used to control the yaw axis motor that is working to stop working, such that the imaging device currently performing the rolling rotation may stop the rotation.

In some embodiments, the second control operation may be any one of the following:

The yaw axis motor that is working may be controlled to stop working immediately such that the imaging device that is performing the rolling rotation may stop the rotation immediately.

The yaw axis motor that is working may continue to work until the roll angle of the imaging device is 0°, and the yaw axis motor may be controlled to stop working such that the imaging device performing the rolling rotation may be controlled to stop the rotation.

The handheld gimbal provided in the present embodiment may be used to execute the handheld gimbal control method provided in the embodiments shown in FIG. 3 to FIG. 6. The technical principles and technical effects are similar, and will not be repeated herein again.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Finally, it should be noted that the foregoing embodiments are merely intended for describing the technical solutions of the present disclosure, but not to limit the present disclosure. Although the present disclosure is described in detail with reference to the foregoing embodiments, it should be understood by those of ordinary skill in the art that the technical solutions described in the foregoing embodiments may still be modified, or a part or all of the technical features may be equivalently replaced without departing from the spirit and scope of the present disclosure. As a result, these modifications or replacements do not make the essence of the corresponding technical solutions depart from the scope of the technical solutions of the present disclosure.

What is claimed is:

1. A method for controlling a handheld gimbal comprising: obtaining an input signal; performing a first control operation triggered by a first trigger signal in response to the input signal being a predetermined first trigger signal, wherein the first control operation is used to control a yaw axis motor disposed on the handheld gimbal to start and continue to work as to enable an imaging device carried by the handheld gimbal to start and continue a rolling rotation; and performing a second control operation triggered by a second trigger signal in response to obtaining a second predetermined trigger signal when the imaging device performs the continuous rolling rotation, wherein the second control operation includes: in response to the second predetermined trigger signal, detecting whether a roll angle of the imaging device is equal to a preset value; in response to detecting that the roll angle of the imaging device is not equal to the preset value, controlling the yaw axis motor to continue to work; and in response to detecting that the roll angle of the imaging device is equal to the preset value, controlling the yaw axis motor to stop working to cause the imaging device to stop the continuous rolling rotation.

2. The method of claim 1, wherein before performing the first control operation triggered by the first trigger signal, further includes:
determining whether at least one of a roll angle of a handle of the handheld gimbal and a roll angle of the imaging device is approximately 0°; and
performing the first control operation in response to at least one of the roll angle of the handle and the roll angle of the imaging device being approximately 0°.

3. The method of claim 1, wherein before performing the first control operation triggered by the first trigger signal, further includes:
determining whether at least one of a pitch angle and a yaw angle of the imaging device is approximately 0°; and
performing the first control operation in response to at least one of the pitch angle and the yaw angle of the imaging device being approximately 0°.

4. The method of claim 1, wherein obtaining the input signal includes:
obtaining an operation direction and a control amount of a rocker in response to detecting a user performing a trigger operation on the rocker disposed on the handheld gimbal; and
generating the input signal based on the operation direction and the control amount.

5. The method of claim 4, wherein the input signal is an edge signal, and generating the input signal based on the operation direction and the control amount includes:
determining whether the input signal is a rising edge signal or a falling edge signal based on the operation direction; and
determining a starting point and an ending point of an amplitude change of the input signal at a rising edge or a falling edge based on the control amount.

6. The method of claim 1, wherein performing the first control operation triggered by the first trigger signal includes:
determining the first control operation triggered by the first trigger signal based on a predetermined correspondence between the first trigger signal and the first control operation; and
performing the first control operation.

7. The method of claim 6, wherein the first control operation includes at least one of:
controlling the yaw axis motor to start and continue to work to cause the imaging device to start and continue the rolling rotation in a clockwise direction;
controlling the yaw axis motor to start and continue to work to cause the imaging device to start and continue the rolling rotation in a counterclockwise direction;
controlling the yaw axis motor to start and continue to work to cause the imaging device to start and continue the rolling rotation in a clockwise direction, and controlling the yaw axis motor to stop working when a rotation angle reaches a first predetermined angle;
controlling the yaw axis motor to start and continue to work to cause the imaging device to start and continue the rolling rotation in a counterclockwise direction, and controlling the yaw axis motor to stop working when the rotation angle reaches a second predetermined angle;
controlling the yaw axis motor to start and continue to work to cause the imaging device to start and continue the rolling rotation in a clockwise direction, controlling the yaw axis motor to continue to work when the rotation angle reaches a third predetermined angle, and controlling the yaw axis motor to stop working when the roll angle of the imaging device is approximately 0°; or
controlling the yaw axis motor to start and continue to work to cause the imaging device to start and continue the rolling rotation in a counterclockwise direction, controlling the yaw axis motor to continue to work when the rotation angle reaches a fourth predetermined angle, and controlling the yaw axis motor to stop working when the roll angle of the imaging device is approximately 0°.

8. The method of claim 7, wherein:
at least one of the first predetermined angle, the second predetermined angle, the third predetermined angle, or the fourth predetermined angle is 360°.

9. The method of claim 1, wherein:
obtaining the input signal includes:
obtaining a first electrical signal and a second electrical signal generated in response to detecting two consecutive user inputs; and
performing the first control operation triggered by the first trigger signal in response to the input signal being the predetermined first trigger signal includes:
performing the first control operation in response to the triggering of the first electrical signal and the second electrical signal being determined to be successful.

10. The method of claim 9, wherein the two consecutive user inputs includes a user moving a rocker in a direction for two consecutive times.

11. The method of claim 9, wherein obtaining the input signal further includes:
determining triggering of the second electrical signal to be successful in response to at least one of:
an amplitude of the second electrical signal being greater than or equal to a specific proportion of an amplitude of the first electrical signal,
a response time of a signal edge change of the second electrical signal being less than a first predetermined duration, or
a time interval between the first electrical signal and the second electrical signal being less than a second predetermined duration.

12. The method of claim 1, wherein the input signal is an edge signal, and obtaining the input signal includes:
obtaining an operation direction and a control amount of a rocker in response to detecting a user performing a trigger operation on the rocker disposed on the handheld gimbal, obtaining the control amount of the rocker including:
obtaining a starting value and an ending value of the control amount based on an initial position and an ending position of the rocker in the operation direction; and
generating the input signal based on the operation direction and the control amount, including:
determining whether the input signal is a rising edge signal or a falling edge signal based on the operation direction; and determining the starting point and the ending point of the amplitude change of the input signal at the rising edge or the falling edge, respectively, based on the starting value and the ending value of the control amount.

13. A handheld gimbal comprising:
a gimbal including a gimbal base and a plurality of axis joints, each of the axis joints including a motor and an axis arm drivingly connected to the motor;
a handle connected to the gimbal base;
an imaging device carried by the gimbal;
a memory storing program instructions; and
a processor configured to execute the program instructions to:
  obtain an input signal; and
  perform a first control operation triggered by a first trigger signal in response to the input signal being a predetermined first trigger signal, wherein the first control operation is used to control a yaw axis motor disposed on the handheld gimbal to start and continue to work as to enable an imaging device carried by the handheld gimbal to start and continue a rolling rotation; and
  perform a second control operation triggered by a second trigger signal in response to obtaining a second predetermined trigger signal when the imaging device performs the continuous rolling rotation, wherein the second control operation includes:
    in response to the second predetermined trigger signal, detecting whether a roll angle of the imaging device is equal to 0°;
    in response to detecting that the roll angle of the imaging device is not equal to 0°, controlling the yaw axis motor to continue to work; and
    in response to detecting that the roll angle of the imaging device is equal to 0°, controlling the yaw axis motor to stop working to cause the imaging device to stop the continuous rolling rotation.

14. The handheld gimbal of claim 13, wherein the processor is further configured to:
  determine whether at least one of a roll angle of a handle of the handheld gimbal and a roll angle of the imaging device is approximately 0°; and
  perform the first control operation in response to at least one of the roll angle of the handle and the roll angle of the imaging device being approximately 0°.

15. The handheld gimbal of claim 13, wherein the processor is further configured to:
  determine whether at least one of a pitch angle and a yaw angle of the imaging device is approximately 0°; and
  perform the first control operation in response to at least one of the pitch angle and the yaw angle of the imaging device being approximately 0°.

16. The handheld gimbal of claim 13, wherein the processor is further configured to:
  obtain an operation direction and a control amount of a rocker in response to detecting a user performing a trigger operation on the rocker disposed on the handheld gimbal; and
  generate the input signal based on the operation direction and the control amount.

17. The handheld gimbal of claim 16, wherein the processor is further configured to:
  determine whether the input signal is a rising edge signal or a falling edge signal based on the operation direction; and
  determine a starting point and an ending point of an amplitude change of the input signal at a rising edge or a falling edge based on the control amount.

18. The handheld gimbal of claim 13, wherein the processor is further configured to:
  determine the first control operation triggered by the first trigger signal based on a predetermined correspondence between the first trigger signal and the first control operation; and
  perform the first control operation.

19. The handheld gimbal of claim 18, wherein the first control operation includes at least one of:
  control the yaw axis motor to start and continue to work to cause the imaging device to start and continue the rolling rotation in a clockwise direction;
  control the yaw axis motor to start and continue to work to cause the imaging device to start and continue the rolling rotation in a counterclockwise direction;
  control the yaw axis motor to start and continue to work to cause the imaging device to start and continue the rolling rotation in a clockwise direction, and control the yaw axis motor to stop working when a rotation angle reaches a first predetermined angle;
  control the yaw axis motor to start and continue to work to cause the imaging device to start and continue the rolling rotation in a counterclockwise direction, and control the yaw axis motor to stop working when the rotation angle reaches a second predetermined angle;
  control the yaw axis motor to start and continue to work to cause the imaging device to start and continue the rolling rotation in a clockwise direction, control the yaw axis motor to continue to work when the rotation angle reaches a third predetermined angle, and control the yaw axis motor to stop working when the roll angle of the imaging device is approximately 0°; or
  control the yaw axis motor to start and continue to work to cause the imaging device to start and continue the rolling rotation in a counterclockwise direction, control the yaw axis motor to continue to work when the rotation angle reaches a fourth predetermined angle, and control the yaw axis motor to stop working when the roll angle of the imaging device is approximately 0°.

20. The handheld gimbal of claim 19, wherein:
at least one of the first predetermined angle, the second predetermined angle, the third predetermined angle, or the fourth predetermined angle is 360°.

* * * * *